US012292183B2

(12) United States Patent
Chang et al.

(10) Patent No.: US 12,292,183 B2

(45) Date of Patent: May 6, 2025

(54) ILLUMINATED KEYBOARD

(71) Applicant: CHICONY ELECTRONICS CO., LTD., New Taipei (TW)

(72) Inventors: Wen-Han Chang, New Taipei (TW); Chao-Chin Hsieh, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/653,282

(22) Filed: May 2, 2024

(65) Prior Publication Data

US 2024/0401794 A1 Dec. 5, 2024

(30) Foreign Application Priority Data

May 30, 2023 (TW) ................................ 112120010

(51) Int. Cl.

| | |
|---|---|
| ***F21V 33/00*** | (2006.01) |
| ***F21V 7/28*** | (2018.01) |
| ***F21V 19/00*** | (2006.01) |
| ***F21V 23/00*** | (2015.01) |
| *F21Y 113/00* | (2016.01) |
| *F21Y 115/10* | (2016.01) |

(52) U.S. Cl.

CPC ............ *F21V 33/0004* (2013.01); *F21V 7/28* (2018.02); *F21V 19/0015* (2013.01); *F21V 23/001* (2013.01); *F21Y 2113/00* (2013.01); *F21Y 2115/10* (2016.08)

(58) Field of Classification Search

CPC .... F21V 33/0004; F21V 7/28; F21V 19/0015; F21V 23/001; F21Y 2115/10; F21Y 2113/00

USPC ...................................................... 362/23.03

See application file for complete search history.

(56) References Cited

U.S. PATENT DOCUMENTS

| | | | | |
|---|---|---|---|---|
| 10,276,326 B1 * | 4/2019 | Wang | ..................... | H01H 13/83 |
| 2014/0334125 A1 * | 11/2014 | Yao | ...................... | G02B 6/0055 362/23.03 |
| 2022/0044889 A1 * | 2/2022 | Ho | ....................... | G02B 6/0083 |

FOREIGN PATENT DOCUMENTS

| | | |
|---|---|---|
| TW | 201807731 A | 3/2018 |

* cited by examiner

*Primary Examiner* — Elmito Breval

*Assistant Examiner* — Hana S Featherly

(74) *Attorney, Agent, or Firm* — MUNCY, GEISSLER, OLDS & LOWE, P.C.

(57) ABSTRACT

An illuminated keyboard includes a metal plate, an illuminated module, and an insulating heat-pressing sheet. The metal plate has an upper surface and a lower surface opposite to each other. The illuminated module includes a circuit structure and a plurality of illuminated elements, wherein the circuit structure has an upper surface and a lower surface opposite to each other, a substrate and a circuit formed on the substrate. The plurality of illuminated elements is electrically connected to the circuit. The insulating heat-pressing sheet is placed between the circuit structure and the metal plate, wherein the circuit structure is attached to either the upper surface or the lower surface of the metal plate through the insulating heat-pressing sheet.

9 Claims, 7 Drawing Sheets

200

ILLUMINATED KEYBOARD

CROSS-REFERENCE TO RELATED APPLICATION

This application claims the priority benefit of Taiwan application serial No. 112120010, filed on May 30, 2023. The entirety of the above-mentioned patent application is hereby incorporated by reference herein and made a part of this specification.

BACKGROUND

1. Technical Field

The present disclosure relates to an illuminated keyboard, particularly to a slim illuminated keyboard with excellent heat dissipation.

2. Description of the Related Art

With the development of the information industry, the prevalence of computers and other electronic products has rapidly increased, among which keyboards are one of the most important and convenient input devices. The development of keyboards is mainly related to ease of use. In recent years, to facilitate the use of keyboards in low-light conditions or to enhance the aesthetic appeal, keyboards with illumination capabilities have been increasingly developed.

The basic structure of an illuminated keyboard consists of a stack of multiple layers, including keycaps, a keyboard base plate, a backlight panel, a circuit board, etc. However, due to consumer demands, electronic products continue to evolve towards smaller sizes to meet the demands for thinness and portability, necessitating further improvements in the structure of illuminated keyboards to reduce their overall thickness. On the other hand, as keyboards become thinner, the risk of overheating increases, making the improvement of heat dissipation an important consideration in keyboard design.

SUMMARY

Technical Problem

Prior art illuminated keyboards have issues with excessive overall thickness and poor heat dissipation.

Solution to Problem

The primary objective of this disclosure is to provide an illuminated keyboard that effectively reduces the thickness of the keyboard while also offering improved heat dissipation.

To achieve the above objective, according to an embodiment, this disclosure provides an illuminated keyboard that comprises a metal plate having an upper surface and a lower surface opposite to each other; an illuminated module, which comprises a circuit structure having an upper surface and a lower surface opposite to each other, a substrate and a circuit formed on the substrate; the plurality of illuminated elements electrically connected to the circuit; and an insulating heat-pressing sheet placed between the circuit structure and the metal plate, wherein the circuit structure is attached to either the upper surface or the lower surface of the metal plate through the insulating heat-pressing sheet.

According to another embodiment, this disclosure provides the illuminated keyboard as described above, wherein the illuminated keyboard further comprises an external circuit board electrically connected to the circuit. The circuit receives power from an external source through the external circuit board and transmits it to the illuminated elements, wherein the total thickness of the circuit structure and the insulating heat-pressing sheet is less than the thickness of the external circuit board.

According to another embodiment, this disclosure provides the illuminated keyboard as described above, wherein the illuminated keyboard further comprises a reflective layer on the substrate covering the circuit. The total thickness of the circuit structure, the insulating heat-pressing sheet, and the reflective layer is less than the thickness of the external circuit board.

According to another embodiment, this disclosure provides the illuminated keyboard as described above, wherein the metal plate is located above the illuminated module. The illuminated keyboard further comprises a key module disposed above the metal plate; and a backlight module disposed below the circuit structure. The backlight module is configured to guide the light emitted by the illuminated elements towards the key module. The plurality of illuminated elements is disposed on the lower surface of the circuit structure and embedded in the backlight module.

According to another embodiment, this disclosure provides the illuminated keyboard as described above, wherein the metal plate is located below the circuit structure. The illuminated keyboard further comprises a key module disposed above the illuminated module; and a backlight module disposed below the metal plate. The backlight module is configured to guide the light emitted by the illuminated elements towards the key module. The plurality of illuminated elements is disposed on the lower surface of the circuit structure and embedded in the backlight module.

According to another embodiment, this disclosure provides the illuminated keyboard as described above, wherein the metal plate is located below the illuminated module. The illuminated keyboard further comprises a key module disposed above the circuit structure. The plurality of illuminated elements is disposed on the upper surface of the circuit structure and arranged to emit light towards the direction of the key module.

According to another embodiment, this disclosure provides the illuminated keyboard as described above, wherein the key module comprises a plurality of key units. The positions of the plurality of illuminated elements correspond to the positions of the plurality of key units.

According to another embodiment, this disclosure provides the illuminated keyboard as described above, wherein the reflective layer is white ink.

According to another embodiment, this disclosure provides the illuminated keyboard as described above, wherein the metal plate includes comprises a plurality of holes. The positions of the plurality of illuminated elements correspond to the positions of the plurality of holes.

Advantageous Effects of the Disclosure

The illuminated module of prior art typically comprises a general flexible circuit board with upper and lower protective layers to control the illuminated module. The illuminated keyboard of this disclosure uses an insulating heat-pressing sheet to directly attach the substrate with circuits on it to the metal plate, eliminating the use of a general flexible circuit board. This effectively reduces the overall thickness of the keyboard and achieves better heat dissipation.

Additionally, the circuits on the substrate of this disclosure are covered by a reflective layer, thereby increasing the amount of reflected light and enhancing the illumination efficiency of the illuminated keyboard. Moreover, the illuminated keyboard of this disclosure can improve heat dissipation and/or enhance light effects by positioning the illuminated elements at the holes of the metal plate.

Further features and advantages of this disclosure can be seen from the following descriptive examples of specific embodiments and the scope of claims of the disclosure.

BRIEF DESCRIPTION OF THE DRAWINGS

The following will explain the present disclosure in more detail with reference to the exemplary specific embodiments shown in the accompanying drawings in which.

DETAILED DESCRIPTION OF THE EMBODIMENTS

Figure 1:
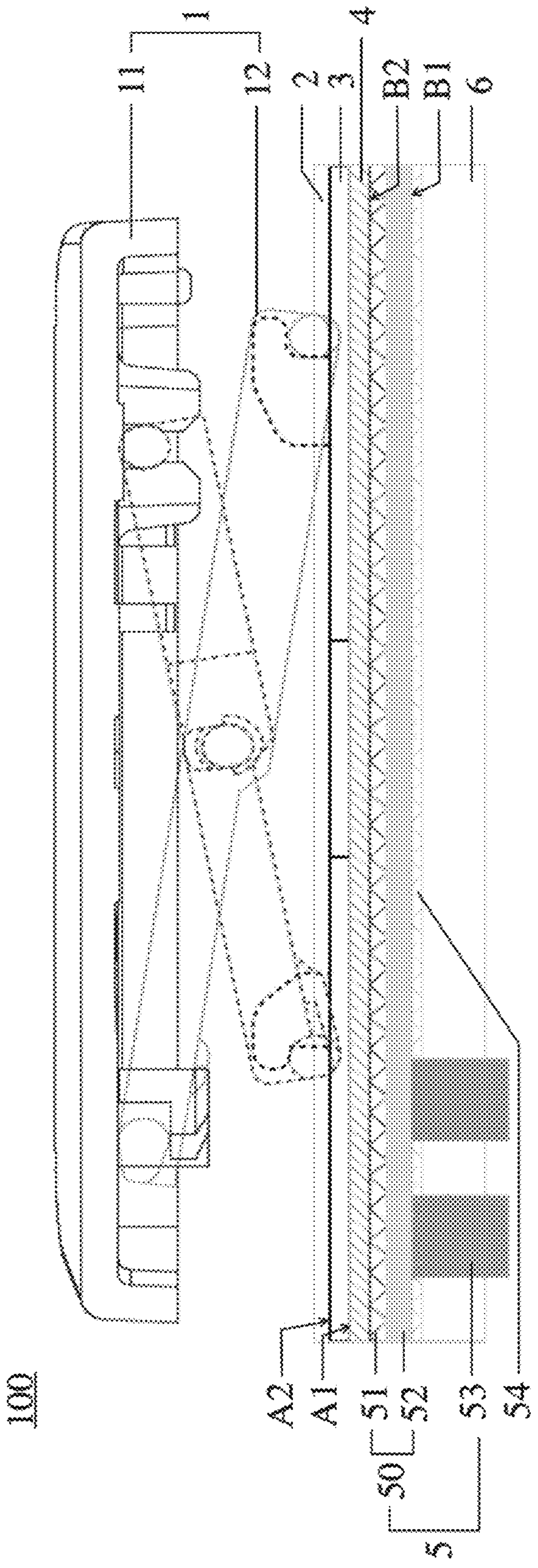
FIG. 1 is a partial sectional view of an illuminated keyboard according to a first embodiment of the present disclosure.

The following is a detailed description of preferred embodiments of an illuminated keyboard of the present disclosure with reference to the relevant drawings, wherein the same elements are denoted by the same reference numerals. It should be noted that the following description provides many different embodiments or examples for implementing the various aspects of this disclosure. These embodiments or examples are for illustrative purposes only and are not intended to limit this disclosure. Those skilled in the art could conceive other advantages of the disclosure based on the content disclosed herein, allowing the disclosure to be implemented or applied in different specific embodiments. Those skilled in the art may modify and/or change the embodiments based on different implementation methods and applications to practice this disclosure without departing from its spirit and scope.

Figure 2:
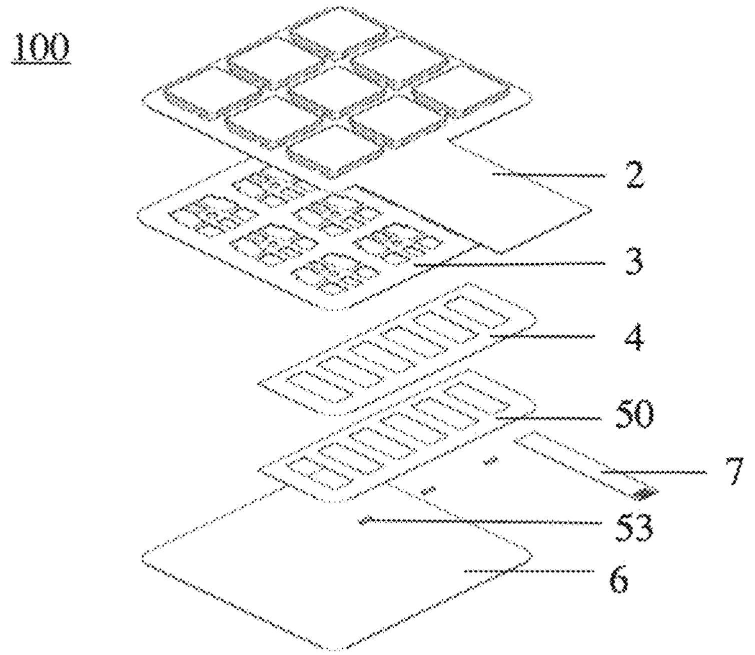
FIG. 2 is a partial exploded perspective view of the illuminated keyboard according to the first embodiment of the present disclosure.

The present disclosure provides an improved illuminated keyboard that reduces the overall thickness of the keyboard and achieves better heat dissipation. FIG. 1 and FIG. 2 respectively show a partial sectional and a partial exploded perspective views of the illuminated keyboard 100 according to a first embodiment of the disclosure. It should be noted that, for simplicity, some structures and components of prior art are not depicted to avoid obscuring the invention, and the drawings are only intended to schematically illustrate and explain the technical features of the disclosure, not to represent the actual size or quantity of the structures or components.

First Embodiment

Referring to FIG. 1 and FIG. 2. The illuminated keyboard 100 of the present disclosure comprises a key module 1, a membrane circuit board 2, a metal plate 3, an insulating heat-pressing sheet 4, an illuminated module 5, a backlight module 6, and an external circuit board 7. The key module 1 comprises a plurality of key units 11 and corresponding a plurality of connecting structures 12, and the illuminated module 5 comprises a circuit structure 50, at least one illuminated element 53, and a reflective layer 54.

The key unit 11 is exposed on the surface of the illuminated keyboard 100 for a user to press. A connecting structure 12 is disposed between the key unit 11 and the metal plate 3, configured to enable reciprocating elevation movement of the key unit 11 relative to the metal plate 3. The key module 1 further comprises a plurality of restoring members (not shown in the figures), each corresponding to the key unit 11 to provide the force for the key unit 11 to return to its original position after being pressed. Restoring members can be rubber domes, metal domes, springs, or magnetic elements. The membrane circuit board 2 is located beneath the key unit 11 and comprises a plurality of key switches (not shown in the figures) for generating key signals in response to the pressing of the key unit 11. The operation and connection method between the key module 1 and the membrane circuit board 2 are substantially the same as the prior art, which are not redundantly described herein.

The metal plate 3 is disposed beneath the membrane circuit board 2 to support the key unit 11, connecting structure 12, and membrane circuit board 2. The material of the metal plate 3 may be, but is not limited to, iron, copper, nickel, stainless steel, and other metal materials. The metal plate 3 has a lower surface A1 and an upper surface A2. In the embodiments shown in FIG. 1 and FIG. 2, the upper surface A2 faces the membrane circuit board 2 located above.

An illuminated module 5 is disposed beneath the metal plate 3. The circuit structure 50 of the illuminated module 5 has a lower surface B1 and an upper surface B2 and comprises a substrate 51 and circuits 52. The substrate 51 can be a polymer resin film, for example, made of polyimide (PI), polyethylene terephthalate (PET), or polyethylene naphthalate (PEN), but is not limited to thereto. In a preferred embodiment, the substrate 51 is a polyimide (PI) film with a thickness ranging from about 1 μm (micrometer) to about 50 μm. As shown in FIG. 1, the circuits 52 can be formed on the lower side surface of the substrate 51 by printing or etching, and the material can be copper, silver, or other metals. The illuminated elements 53 may be, but are not limited to, light-emitting diodes, disposed on the substrate 51 and electrically connected to the circuits 52.

An insulating heat-pressing sheet 4 is disposed between the upper surface B2 of the circuit structure 50 and the lower surface A1 of the metal plate 3. The insulating heat-pressing sheet 4 is used to adhere the upper surface B2 of the circuit structure 50 to the lower surface A1 of the metal plate 3. The insulating properties of the insulating heat-pressing sheet 4 also prevent electrical connection between the circuits 52 and the metal plate 3.

In this embodiment, a reflective layer 54 can be disposed on parts of the lower side surface of the substrate 51 by printing, coating, vapor deposition, laminating, or other appropriate methods. Further, the reflective layer 54 covers the circuits 52 to reflect the light emitted by the illuminated elements 53, thereby increasing the light output efficiency. In this embodiment, the reflective layer 54 may be a light-colored ink layer with a reflective effect such as white, silver, or light gray, or it can be a film or coating with reflective properties, the present disclosure is not limited thereto. It should be noted that because the reflective layer 54 covers the circuits 52, it can further prevent the light emitted by the illuminated elements 53 from passing through the circuits 52 and altering the light color. Taking copper circuits as an example for the circuits 52, if the reflective layer 54 does not cover the circuits 52, the light emitted by the illuminated elements 53 may pass through the copper circuits (i.e., the circuits 52) and take on a coppery color. The arrangement of the reflective layer 54 in this embodiment solves this problem. Additionally, the reflective layer 54 is an optional component, and the disclosure comprises other embodiments without the reflective layer.

The backlight module 6 is disposed below the illuminated module 5. The backlight module 6 comprises components such as a light shielding sheet, a light guide plate, a reflective sheet, and an accommodating space for accommodating the illuminated elements 53, which operates on the same principle and structure as prior art and is not elaborated here. In the first embodiment, the illuminated element 53 is disposed in an inverted manner (emitting light towards the backlight module 6) on the lower surface B1 of the circuit structure 50, one end of which is electrically connected to the circuit 52 and the other end embedded in the backlight module 6. The backlight module 6 is configured to guide the light emitted by the illuminated element 53 towards the direction of the key unit 11, thereby producing a lighting effect in the illuminated keyboard 100.

Referring to FIG. 2, the illuminated keyboard 100 further comprises an external circuit board 7 electrically connected to the circuit 52, configured to receive power from an external source or to connect to external electronic devices (such as a computer host, etc.). The external circuit board 7 can be connected to the circuit 52 by thermally welding. The circuit 52 receives power from the external circuit board 7 and transmits it to the illuminated elements 53 to make it illuminate. In this embodiment, the external circuit board 7 is a flexible circuit board, and other materials such as printed circuit boards can be used as needed, not limited thereto. It is noted that the external circuit board 7 comprises a layered structure of an upper protective layer, a circuit board body (for instance, composed of polyimide substrate and copper etched circuits), and a lower protective layer, with a thickness of about 0.2 mm. In contrast, the substrate 51 and circuit 52 of this disclosure are laminated onto the metal plate 3 through an insulating heat-pressing sheet 4. The substrate 51 and insulating heat-pressing sheet 4 are provided above the circuit 52, and the backlight module 6 is provided below, thus, additional upper and lower protective layers are not required. In this embodiment, the total thickness of the substrate 51, the circuit 52, the reflective layer 54, and the insulating heat-pressing sheet 4 of this disclosure is only about 0.07 mm to 0.08 mm. In embodiments without the reflective layer 54, the thickness of the substrate 51, circuit 52, and the insulating heat-pressing sheet 4 will be even lower. It is evident that the total thickness of the substrate 51, the circuit 52, the insulating heat-pressing sheet 4, and the optional reflective layer 54 of this disclosure is less than the thickness of the external circuit board 7, effectively enhancing the thinness of the illuminated keyboard 100.

Based on the above, compared to the prior art flexible circuit boards with upper and lower protective layers, which have a thickness of about 0.2 mm, this disclosure reduces the overall thickness of the keyboard and manufacturing costs by using an insulating heat-pressing sheet 4 to laminate the circuit structure 50 onto the metal plate 3. Furthermore, because the circuit structure 50 and illuminated elements 53 are only laminated to the metal plate 3 through the insulating heat-pressing sheet 4, which can effectively shorten the distance between the circuit 52 and the illuminated element 53 and the metal plate 3. This allows the heat generated by the circuit 52 and illuminated element 53 to be transferred to the metal plate 3 more efficiently, thereby achieving better heat dissipation effects.

Second Embodiment

Figure 3:
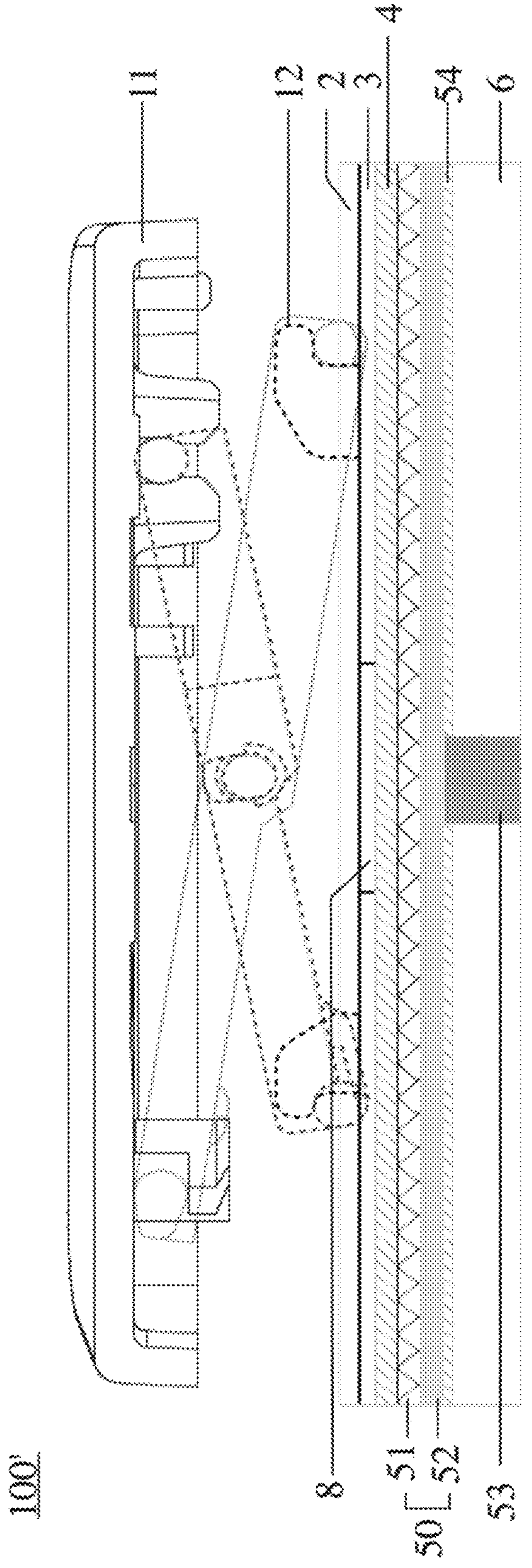
FIG. 3 is a partial sectional view of an illuminated keyboard according to a second embodiment of the present disclosure.

FIG. 3 is a partial sectional view of the illuminated keyboard 100' according to the second embodiment of the present disclosure. The structure of the illuminated keyboard 100' is substantially the same as that of the illuminated keyboard 100 of the first embodiment, and the similarities are not reiterated. The difference between the first and second embodiments lies in the placement of the illuminated elements 53 of the illuminated keyboard 100' aligned with the holes 8 of the metal plate 3, to further improve heat dissipation efficiency. Preferably, the holes 8 may be structural holes or dust holes beneath the key units 11, the dust holes are positioned below the key switches of the membrane circuit board 2, to prevent dust or foreign objects from accumulating under the key switches and causing malfunction. Notably, in this embodiment, the illuminated keyboard 100' further comprises a plurality of restoring members, which are translucent rubber domes (not shown in the figures). The rubber domes are positioned corresponding to the key switches and cover the holes 8. Generally, the brightness around the illuminated elements 53 is higher, and the light emitted by the illuminated elements 53 can be diffused by the rubber domes, resulting in more uniform and soft light around the illuminated elements 53. Therefore, positioning the illuminated elements 53 at the dust holes not only increases heat dissipation benefits but also enhances light diffusion to further improve light efficiency.

Third Embodiment

Figure 4:
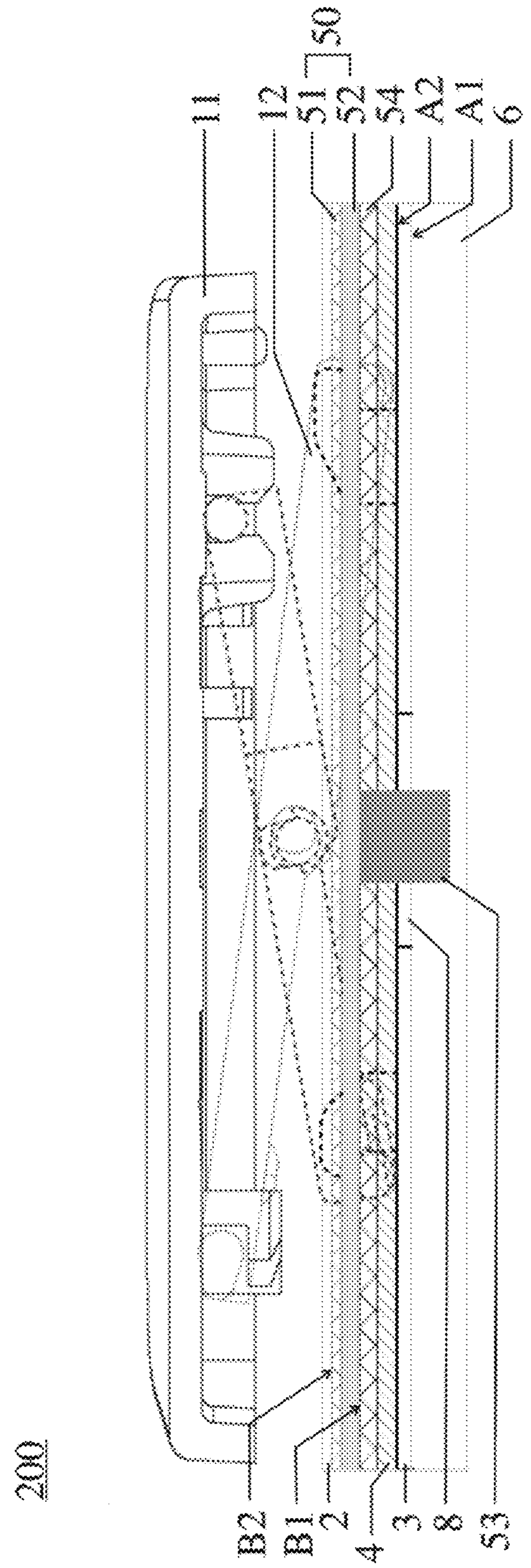
FIG. 4 is a partial sectional view of an illuminated keyboard according to a third embodiment of the present disclosure.
Figure 5:
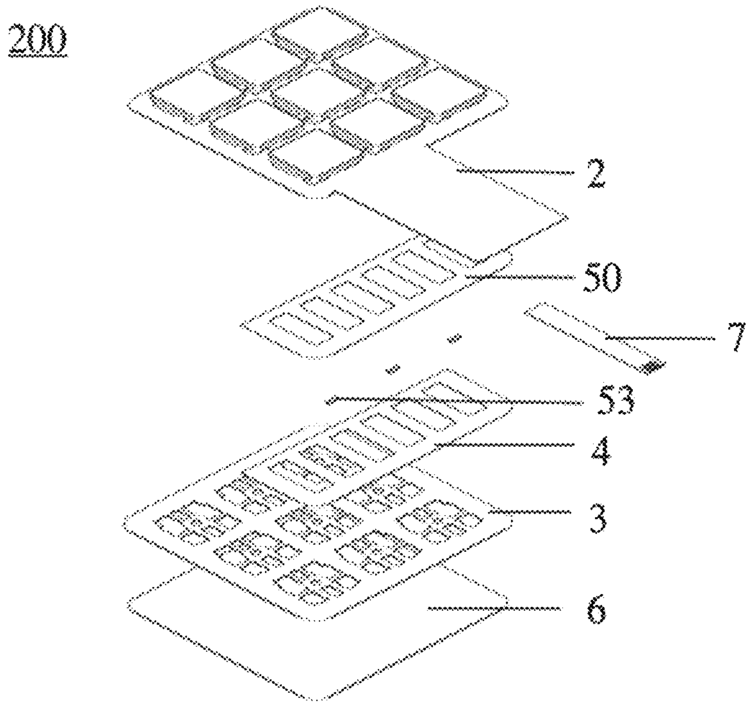
FIG. 5 is a partial exploded perspective view of the illuminated keyboard according to the third embodiment of the present disclosure.

FIG. 4 and FIG. 5 respectively show a sectional view and an exploded perspective view of the illuminated keyboard 200 according to the third embodiment of the present disclosure. The difference between the first and third embodiments lies in the relative positioning of the metal plate 3, the illuminated module 5, and other layer structures. In the third embodiment, the circuit structure 50 of the illuminated module 5 is located above the metal plate 3. Specifically, the assembly sequence of the illuminated keyboard 200 components from top to bottom in the third embodiment is the key unit 11, the membrane circuit board 2, the substrate 51, the circuit 52, the reflective layer 54, the insulating heat-pressing sheet 4, the metal plate 3, and the backlight module 6. In this embodiment, the same components will use the previously mentioned reference numerals, and the same technical features will not be described again.

Referring to FIG. 4 and FIG. 5. The upper surface A2 of the metal plate 3 faces the membrane circuit board 2 located above. The circuit structure 50 is placed above the metal plate 3, and the insulating heat-pressing sheet 4 is disposed between the lower surface B1 of the circuit structure 50 and the upper surface A2 of the metal plate 3. The insulating heat-pressing sheet 4 is used to adhere the circuit structure 50 to the upper surface A2 of the metal plate 3.

In this embodiment, the reflective layer 54 is formed on the lower surface B1 of the circuit structure 50 and covers the circuit 52. The reflective layer 54 is an optional component, and embodiments without the reflective layer 54 are also included in the present disclosure. In another embodiment, the insulating heat-pressing sheet 4 is attached avoiding the reflective layer 54 (e.g., by making the insulating heat-pressing sheet 4 in a dotted or grid pattern). The backlight module 6 is disposed below the lower surface A1 of the metal plate 3. In this embodiment, the illuminated element 53 is mounted in an inverted manner (emitting light towards the backlight module 6) on the lower surface B1 of the circuit structure 50, electrically connected to the circuit 52, and embedded downward into the accommodating space of the backlight module 6. In this embodiment, the illuminated element 53 penetrates the metal plate 3 and is embedded downward into the accommodating space of the backlight module 6. The backlight module 6 is configured to guide the light emitted by the illuminated element 53 towards the direction of the key unit 11. In this embodiment, the illuminated element 53 is disposed at the hole 8 of the metal plate 3 to improve heat dissipation and/or light efficiency, but the present disclosure is not limited to this arrangement, and the illuminated element 53 can also be placed at other locations on the metal plate 3.

In another embodiment, the circuit 52 of the third embodiment can be combined with the membrane circuit board 2 above, meaning that the circuit 52 and the membrane circuit board 2 are combined into a multi-layer circuit board structure, thereby eliminating the need for the substrate 51 (because the membrane circuit board 2 provides support). Then, the multi-layer circuit board structure is adhered to the upper surface A2 of the metal plate 3 using the insulating heat-pressing sheet 4.

Fourth Embodiment

Figure 6:
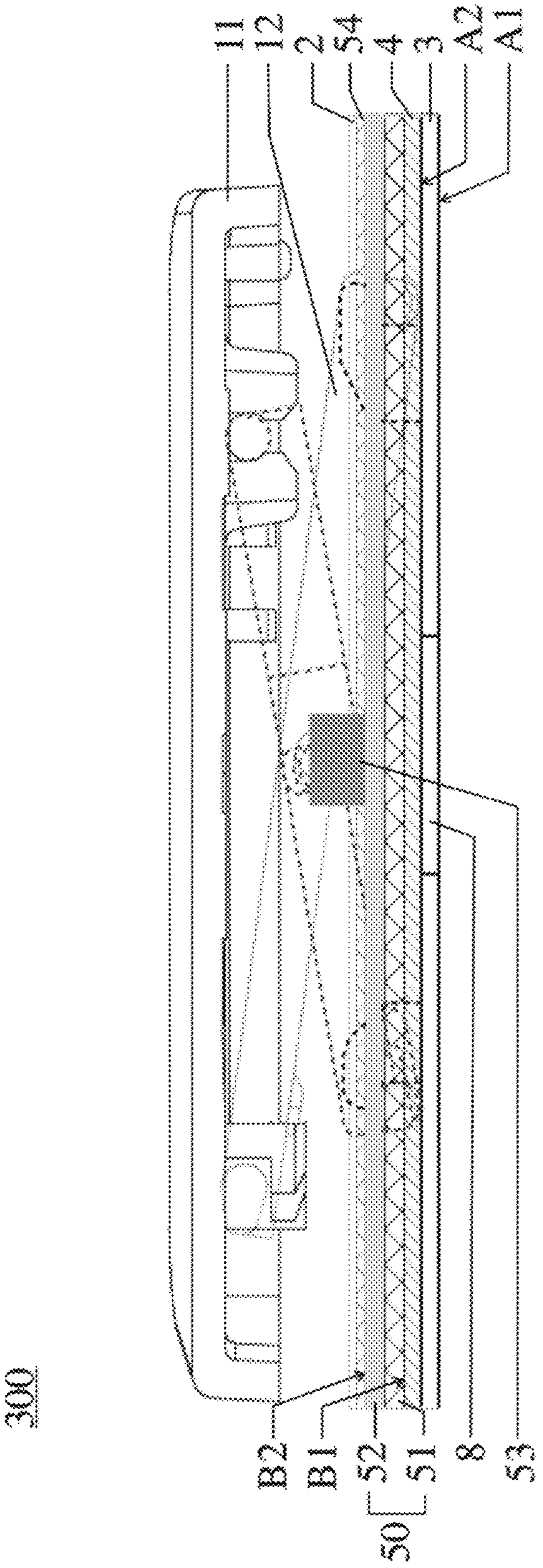
FIG. 6 is a partial sectional view of an illuminated keyboard according to a fourth embodiment of the present disclosure.
Figure 7:
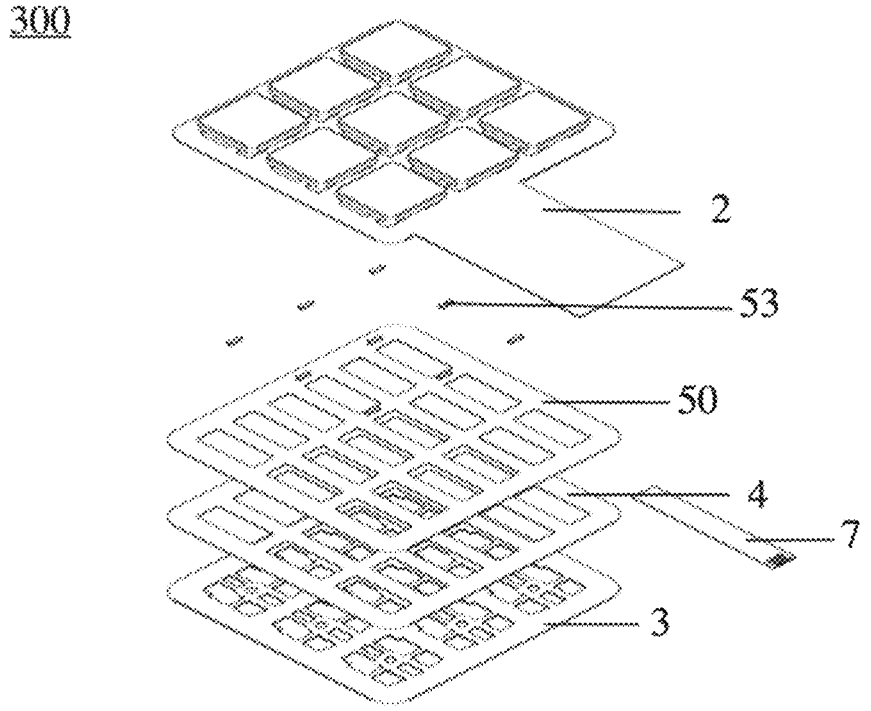
FIG. 7 is a partial exploded perspective view of the illuminated keyboard according to the fourth embodiment of the present disclosure.

FIG. 6 and FIG. 7 respectively show a partial sectional view and an exploded perspective view of the illuminated keyboard 300 according to the fourth embodiment of the present disclosure. In the fourth embodiment, the circuit structure 50 of the illuminated module 5 is located above the metal plate 3. Specifically, in this embodiment, the components of the illuminated keyboard 200 are installed from top to bottom in the following order: the key unit 11, the membrane circuit board 2, the reflective layer 54, the circuit 52, the substrate 51, the insulating heat-pressing sheet 4, and the metal plate 3. In this embodiment, the same components will use the aforementioned reference numerals, and the same technical features will not be repeated.

Referring to FIG. 6 and FIG. 7, the circuit structure 50 is placed above the metal plate 3, and the lower surface B1 of the circuit structure 50 is attached to the upper surface A1 of the metal plate 3 using an insulating heat-pressing sheet 4. Unlike the illuminated keyboard 200, the illuminated elements 53 of the illuminated keyboard 300 are not disposed in an inverted manner on the circuit structure 50, but are placed on the upper surface B2 of the circuit structure 50 and emit light upwards towards the key unit 11. Each key unit 11 has a corresponding illuminated element 53 beneath it, eliminating the need for a backlight module 6. In other embodiments, multiple key units 11 may correspond to a single illuminated element 53, or a single key unit 11 may correspond to multiple illuminated elements 53. The reflective layer 54 is optional, and embodiments without the reflective layer 54 are also included in this disclosure.

From the detailed description of the embodiments of the present disclosure, it is apparent that the illuminated keyboard of the present disclosure achieves a the purpose of reducing keyboard thickness by using an insulating heat-pressing sheet to laminate a substrate with a circuit structure on its surface to a metal plate, to replace the prior art's use of a flexible circuit board, which had the disadvantage of increased thickness due to the upper and lower protective layers. Additionally, as the distance between the circuit structure and the illuminated elements to the metal plate is reduced, better heat dissipation is achieved. Furthermore, by printing or coating a light-colored reflective layer on the substrate to cover the circuit structure, light reflection efficiency is improved, thereby enhancing the overall light output. On the other hand, by placing the illuminated elements at the holes in the metal plate, further improvements in heat dissipation and/or light effect are achieved.

Although the preferred embodiments of the present disclosure have been disclosed, it should be understood that the embodiments and features mentioned above are provided as examples only and are not intended to limit the disclosure. Within the scope of the disclosure, those skilled in the art can make numerous variations and substitutions without departing from the spirit and scope of the disclosure as claimed in the claims below.

What is claimed is:

1. An illuminated keyboard, comprising:

a key module comprising a plurality of key units and corresponding a plurality of connecting structures;

a metal plate having an upper surface and a lower surface opposite to each other, wherein the connecting structures are disposed between the key units the metal plate, and the metal plate is configured to support the key units and the connecting structures;

an illuminated module, comprising:

a circuit structure having an upper surface and a lower surface opposite to each other, comprising a substrate and a circuit formed on the substrate; and a plurality of illuminated elements electrically connected to the circuit; and an insulating heat-pressing sheet placed between the circuit structure and the metal plate, wherein the circuit structure is attached to either the upper surface or the lower surface of the metal plate through the insulating heat-pressing sheet.

2. The illuminated keyboard according to claim 1, wherein the illuminated keyboard further comprises an external circuit board electrically connected to the circuit, the circuit receives power from an external source through the external circuit board and transmits it to the illuminated elements, wherein the total thickness of the circuit structure and the insulating heat-pressing sheet is less than the thickness of the external circuit board.

3. The illuminated keyboard according to claim 2, wherein the illuminated module further comprises a reflective layer on the substrate covering the circuit, wherein the total thickness of the circuit structure, the insulating heat-pressing sheet, and the reflective layer is less than the thickness of the external circuit board.

4. The illuminated keyboard of claim 3, wherein the reflective layer is white ink.

5. The illuminated keyboard according to claim 1, wherein the metal plate is located above the illuminated module, and the illuminated keyboard further comprises:

a key module disposed above the metal plate; and a backlight module disposed below the circuit structure, the backlight module is configured to guide the light emitted by the illuminated elements towards the key module, wherein the plurality of illuminated elements is disposed on the lower surface of the circuit structure and embedded in the backlight module.

6. The illuminated keyboard according to claim 1, wherein the metal plate is located below the circuit structure, and the illuminated keyboard further comprises:

a key module disposed above the illuminated module; and a backlight module disposed below the metal plate, the backlight module is configured to guide the light emitted by the illuminated elements towards the key module, wherein the plurality of illuminated elements is disposed on the lower surface of the circuit structure and embedded in the backlight module.

7. The illuminated keyboard according to claim 1, wherein the metal plate is located below the illuminated module, and wherein the plurality of illuminated elements is disposed on the upper surface of the circuit structure and arranged to emit light towards the key module.

8. The illuminated keyboard according to claim 1, wherein the positions of the plurality of illuminated elements correspond to the positions of the plurality of key units.

9. The illuminated keyboard according to claim 1, wherein the metal plate comprises a plurality of holes, and the positions of the plurality of illuminated elements correspond to the positions of the plurality of holes.

* * * * *